United States Patent
Wang et al.

(10) Patent No.: US 11,006,413 B2
(45) Date of Patent: May 11, 2021

(54) NARROW-BAND COMMUNICATION

(71) Applicant: Google LLC, Mountain View, CA (US)

(72) Inventors: Jibing Wang, Saratoga, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/833,312

(22) Filed: Dec. 6, 2017

(65) Prior Publication Data

US 2019/0174497 A1    Jun. 6, 2019

(51) Int. Cl.
  *H04W 72/04* (2009.01)
  *H04W 72/12* (2009.01)
  *H04L 5/00* (2006.01)
  *H04W 76/27* (2018.01)

(52) U.S. Cl.
  CPC ....... *H04W 72/0453* (2013.01); *H04L 5/0053* (2013.01); *H04L 5/0094* (2013.01); *H04L 5/0098* (2013.01); *H04W 72/048* (2013.01); *H04W 72/1215* (2013.01); *H04W 72/1289* (2013.01); *H04W 76/27* (2018.02); *H04L 5/0012* (2013.01); *H04W 72/0446* (2013.01)

(58) Field of Classification Search
  CPC ........... H04W 72/0453; H04W 72/042; H04W 72/0446; H04W 74/0833; H04W 76/27; H04W 72/0406; H04W 88/02; H04W 72/1289; H04W 16/14
  See application file for complete search history.

(56) References Cited

U.S. PATENT DOCUMENTS

| 5,543,811 A | 8/1996 | Chethik |
| 6,711,224 B1 | 3/2004 | Benning et al. |
| 8,346,286 B2 | 1/2013 | Lee et al. |

(Continued)

FOREIGN PATENT DOCUMENTS

| EP | 3081041 | 10/2016 |
| EP | 3105958 | 12/2016 |

(Continued)

OTHER PUBLICATIONS

"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.

(Continued)

*Primary Examiner* — Asad M Nawaz
*Assistant Examiner* — Najeeb Ansari
(74) *Attorney, Agent, or Firm* — Colby Nipper

(57) ABSTRACT

The present disclosure describes methods and apparatuses for narrow-band communication. In some aspects, a base station determines a quantity of resource elements to allocate to a user device for wireless communication based on a state of the user device. The base station selects, from a resource block, resource elements for the user device that include the determined quantity of resource elements and a portion of subcarriers of the resource block. The base station then communicates, to the user device, an identification of the selected resource elements that includes respective frequencies and time locations of the selected resource elements within the resource block.

20 Claims, 9 Drawing Sheets

(56) References Cited

U.S. PATENT DOCUMENTS

| | | | |
|---|---|---|---|
| 8,543,063 B2 | 9/2013 | Bergel et al. |
| 8,594,053 B2 | 11/2013 | Kim et al. |
| 8,605,644 B2 | 12/2013 | Wang |
| 8,774,150 B1 | 7/2014 | Jeffery et al. |
| 8,923,192 B2 | 12/2014 | Gong |
| 9,204,441 B2 | 12/2015 | Nagaraja et al. |
| 9,253,766 B2 | 2/2016 | Yang et al. |
| 9,258,798 B2 | 2/2016 | Li et al. |
| 9,271,290 B2 | 2/2016 | Pelletier et al. |
| 9,414,430 B2 | 8/2016 | Vajapeyam et al. |
| 9,425,923 B2 | 8/2016 | Ratasuk et al. |
| 9,686,667 B2 | 6/2017 | Artuso |
| 9,900,133 B2 | 2/2018 | Lu et al. |
| 10,080,244 B2 | 9/2018 | Lei et al. |
| 10,084,535 B1 | 9/2018 | Speidel et al. |
| 10,148,329 B2 | 12/2018 | Yue et al. |
| 10,375,671 B2 | 8/2019 | Stauffer et al. |
| 10,608,721 B2 | 3/2020 | Wang et al. |
| 10,700,769 B2 | 6/2020 | Wang et al. |
| 2006/0205346 A1 | 9/2006 | Evans et al. |
| 2008/0018427 A1 | 1/2008 | Ezra et al. |
| 2009/0102715 A1 | 4/2009 | Lou et al. |
| 2009/0180451 A1 | 7/2009 | Alpert et al. |
| 2010/0304680 A1 | 12/2010 | Kuffner et al. |
| 2011/0002373 A1 | 1/2011 | Jeon |
| 2011/0128866 A1 | 6/2011 | Tian et al. |
| 2012/0039280 A1 | 2/2012 | Chen et al. |
| 2012/0208547 A1 | 8/2012 | Geirhofer et al. |
| 2012/0275384 A1 | 11/2012 | Long et al. |
| 2012/0295623 A1 | 11/2012 | Siomina et al. |
| 2013/0301454 A1 | 11/2013 | Seol et al. |
| 2014/0146732 A1 | 5/2014 | Dlufunmilo et al. |
| 2014/0213277 A1 | 7/2014 | Jang |
| 2014/0362752 A1 | 12/2014 | Jha et al. |
| 2015/0126239 A1 | 5/2015 | Kim et al. |
| 2015/0289147 A1 | 10/2015 | Lou et al. |
| 2015/0382205 A1 | 12/2015 | Lee et al. |
| 2016/0029235 A1 | 1/2016 | Kim et al. |
| 2016/0050002 A1 | 2/2016 | Wei et al. |
| 2016/0072564 A1 | 3/2016 | Li et al. |
| 2016/0127997 A1 | 5/2016 | Ang et al. |
| 2016/0135213 A1 | 5/2016 | Zhu et al. |
| 2016/0191132 A1 | 6/2016 | Rajogopal et al. |
| 2016/0270027 A1 | 9/2016 | Ang et al. |
| 2016/0286524 A1 | 9/2016 | Griot et al. |
| 2016/0294531 A1 | 10/2016 | Loehr et al. |
| 2016/0345189 A1 | 11/2016 | Miyagawa et al. |
| 2016/0345234 A1 | 11/2016 | Yang et al. |
| 2016/0353424 A1 | 12/2016 | Stirling-Gllacher et al. |
| 2017/0026293 A1 | 1/2017 | Desclos et al. |
| 2017/0026962 A1 | 1/2017 | Liu et al. |
| 2017/0149480 A1 | 5/2017 | Kakishima et al. |
| 2017/0180095 A1 | 6/2017 | Xue et al. |
| 2017/0195031 A1 | 7/2017 | Onggonsanusi et al. |
| 2017/0201982 A1 | 7/2017 | Alvarino et al. |
| 2017/0237783 A1 | 8/2017 | Yang et al. |
| 2017/0257842 A1 | 9/2017 | Hessler |
| 2017/0264350 A1 | 9/2017 | Sanderovich et al. |
| 2017/0310417 A1 | 10/2017 | Jung et al. |
| 2017/0331577 A1 | 11/2017 | Parkvall et al. |
| 2017/0331670 A1 | 11/2017 | Parkvall et al. |
| 2017/0347334 A1 | 11/2017 | Akkarakaran et al. |
| 2017/0367046 A1 | 12/2017 | Papasakellariou |
| 2017/0367069 A1 | 12/2017 | Agiwal et al. |
| 2017/0374579 A1 | 12/2017 | Wang et al. |
| 2018/0014251 A1* | 1/2018 | Sambhwani ...... H04W 52/0216 |
| 2018/0070282 A1* | 3/2018 | Su ................ H04W 36/32 |
| 2018/0077734 A1 | 3/2018 | Kim et al. |
| 2018/0103426 A1* | 4/2018 | Nacer ............. H04W 52/0209 |
| 2018/0109353 A1 | 4/2018 | Kwak et al. |
| 2018/0139014 A1 | 5/2018 | Kiong et al. |
| 2018/0139701 A1 | 5/2018 | Want et al. |
| 2018/0145732 A1 | 5/2018 | Shen et al. |
| 2018/0184422 A1* | 6/2018 | Cavalcanti ........ H04W 72/0446 |
| 2018/0191415 A1 | 7/2018 | Aryafar et al. |
| 2018/0199306 A1 | 7/2018 | Stephen et al. |
| 2018/0206217 A1 | 7/2018 | Martin et al. |
| 2018/0206268 A1 | 7/2018 | Abdallah et al. |
| 2018/0213529 A1 | 7/2018 | Lee et al. |
| 2018/0227902 A1 | 8/2018 | Gholmieh et al. |
| 2018/0227960 A1 | 8/2018 | Belghoul et al. |
| 2018/0279303 A1 | 9/2018 | Sun et al. |
| 2018/0279324 A1 | 9/2018 | Wang et al. |
| 2018/0295552 A1 | 10/2018 | Chakraborty et al. |
| 2018/0332605 A1 | 11/2018 | Pelletier |
| 2018/0343043 A1 | 11/2018 | Hakola et al. |
| 2018/0367230 A1 | 12/2018 | Su et al. |
| 2019/0007844 A1 | 1/2019 | Müller et al. |
| 2019/0029005 A1* | 1/2019 | Bendlin ............ H04W 72/042 |
| 2019/0037586 A1 | 1/2019 | Park et al. |
| 2019/0052419 A1 | 2/2019 | Yang et al. |
| 2019/0058516 A1 | 2/2019 | Yang et al. |
| 2019/0069321 A1 | 2/2019 | Akkarakaran et al. |
| 2019/0089436 A1 | 3/2019 | Wei et al. |
| 2019/0089506 A1 | 3/2019 | Takeda et al. |
| 2019/0123798 A1 | 4/2019 | Lou et al. |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0190577 A1 | 6/2019 | Wang et al. |
| 2019/0190591 A1 | 6/2019 | Wang et al. |
| 2019/0190641 A1 | 6/2019 | Wang et al. |
| 2019/0191440 A1 | 6/2019 | Wang et al. |
| 2019/0200322 A1 | 6/2019 | Wang et al. |
| 2019/0229789 A1 | 7/2019 | Zhang et al. |
| 2019/0230603 A1 | 7/2019 | Liu et al. |
| 2019/0230607 A1 | 7/2019 | Chung et al. |
| 2019/0239168 A1 | 8/2019 | Li et al. |
| 2019/0261380 A1 | 8/2019 | Iyer et al. |
| 2019/0288809 A1 | 9/2019 | Iyer et al. |
| 2019/0306830 A1 | 10/2019 | Wang et al. |
| 2019/0349968 A1 | 11/2019 | Yerramalli et al. |
| 2019/0356368 A1 | 11/2019 | Liu et al. |
| 2019/0373557 A1* | 12/2019 | Agardh ............ H04W 52/028 |
| 2019/0380140 A1 | 12/2019 | Wong et al. |
| 2020/0028745 A1 | 1/2020 | Parkvall et al. |
| 2020/0052782 A1 | 2/2020 | Wang et al. |
| 2020/0275424 A1 | 8/2020 | Wang et al. |
| 2020/0374050 A1 | 11/2020 | Wang et al. |

FOREIGN PATENT DOCUMENTS

| | | |
|---|---|---|
| EP | 3123802 | 2/2017 |
| KR | 100860050 | 9/2008 |
| WO | 2013070149 | 5/2013 |
| WO | 2015086215 | 6/2015 |
| WO | 2016119882 | 8/2016 |
| WO | 2016204811 | 12/2016 |
| WO | 2017011802 | 1/2017 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017195463 | 11/2017 |
| WO | 2017196243 | 11/2017 |
| WO | 2018031846 | 2/2018 |
| WO | 2018034998 | 2/2018 |
| WO | 2018064068 | 4/2018 |
| WO | 2019112648 | 6/2019 |
| WO | 2019193768 | 10/2019 |

OTHER PUBLICATIONS

"Leading the LTE IoT Evolution to Connect the Massive Internet of Things", Qualcomm, Inc., Jun. 2017, 41 pages.

(56) References Cited

OTHER PUBLICATIONS

"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
Jantti, "Machine Type Communications for Internet of Things—Recent advances and future possibilities", WNCG; Seminar, Oct. 7, 2016, 1 page.
Landstrom, et al., "NB-IOT: A Sustainable Technology for Connecting Billions of Devices", Ericsson Technology Review; Standardizing Narrowband IoT, Apr. 22, 2016, 12 pages.
Pederson, et al., "A Flexible Frame Structure for 5G Wide Area", Aalborg University, Proceedings of IEEE VTC Fall—2015, 2015, 6 pages.
Dutta, et al., "Frame Structure Design and Analysis for Millimeter Wave Cellular Systems", avix.org; NYU Wireless, New York University Tandon School of Engineering, Aug. 20, 2016, 31 pages.
"Restriction Requirement", U.S. Appl. No. 15/852,572, dated Jun. 11, 2018, 9 pages.
"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.
"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.
"International Search Report and Written Opinion", PCT Application No. PCT/US2018/041696, dated Oct. 9, 2018, 30 pages.
"International Search Report and Written Opinion", PCT Application No. PCT/US2018/046004, Nov. 22, 2018, 13 pages.
"Invitation to Pay Additional Fees", PCT Application No. PCT/US2018/049403, Nov. 19, 2018, 13 pages.
"Non-Final Office Action", U.S. Appl. No. 15/852,572, dated Sep. 14, 2018, 6 pages.
"Restriction Requirement", U.S. Appl. No. 15/842,318, dated Oct. 4, 2018, 7 pages.
Gineste, et al., "Narrowband IoT Service Provision to 5G User Equipment via a Satellite Component", 2017 IEEE GLOBECOM Workshops, IEEE, Dec. 4, 2017, Dec. 4, 2017, 4 pages.
Thales, et al., "FS_5GSAT, Draft Use Case, Internet of Things with a Satellite Component", 3GPP TSG-SA WG1 Meeting #80, S1-174441, Reno, Nevada, USA, Nov. 27-Dec. 1, 2017, 2 pages.
"Final Office Action", U.S. Appl. No. 15/842,318, dated Jul. 10, 2019, 15 Pages.
"First Action Interview Office Action", U.S. Appl. No. 15/842,318, dated May 7, 2019, 3 pages.
"International Search Report and Written Opinion", PCT Application No. PCT/US2018/065829, dated Jun. 18, 2019, 28 pages.
"International Search Report and Written Opinion", PCT Application No. PCT/US2018/065557, dated Jun. 21, 2019, 38 pages.
"Non-Final Office Action", U.S. Appl. No. 15/939,060, dated May 23, 2019, 15 pages.
"Pre-Interview Communication", U.S. Appl. No. 15/844,093, dated Jun. 28, 2019, 5 pages.
"First Action Interview Office Action", U.S. Appl. No. 15/844,093, dated Sep. 16, 2019, 4 Pages.
"Non-Final Office Action", U.S. Appl. No. 15/832,395, dated Aug. 30, 2019, 20 Pages.
"Non-Final Office Action", U.S. Appl. No. 16/446,416, dated Oct. 18, 2019, 7 Pages.
"Notice of Allowance", U.S. Appl. No. 15/842,241, dated Aug. 5, 2019, 6 pages.
"Written Opinion of the International Searching Authority", PCT Application No. PCT/US2018/046004, dated Oct. 21, 2019, 6 pages.
"Final Office Action", U.S. Appl. No. 15/832,395, 23 Pages.
"First Action Interview Office Action", U.S. Appl. No. 16/142,952, dated Jan. 30, 2020, 6 Pages.
"International Preliminary Report on Patentability", PCT Application No. PCT/US2018/046004, dated Jan. 23, 2020, 21 pages.
"International Preliminary Report on Patentability", PCT Application No. PCT/US2018/049403, dated Mar. 13, 2020, 20 pages.
"International Preliminary Report on Patentability", PCT Application No. PCT/US2018/067367, dated Mar. 17, 2020, 23 pages.
"Notice of Allowance", U.S. Appl. No. 16/142,952, dated Feb. 28, 2020, 9 Pages.
"Notice of Allowance", U.S. Appl. No. 15/844,093, dated Mar. 2, 2020, 10 Pages.
"Written Opinion of the International Preliminary Examining Authority", PCT Application No. PCT/US2018/065557, dated Feb. 4, 2020, 13 pages.
Guidotti, et al., "LTE-Based Satellite Communications in LEO Mega-Constellations", 2017 John Wiley & Sons, Ltd., 2017, 17 pages.
O'Hara, et al., "Providing Narrowband IoT Coverage with Low Earth Orbit Satellites", 2019 Horizon House Publications, Inc., 2019, 4 pages.
"Final Office Action", U.S. Appl. No. 15/939,060, dated Nov. 29, 2019, 17 pages.
"Notice of Allowance", U.S. Appl. No. 15/842,241, dated Dec. 5, 2019, 5 Pages.
"Pre-Interview Communication", U.S. Appl. No. 16/142,952, dated Dec. 20, 2019, 5 Pages.
"Written Opinion", PCT Application No. PCT/US2018/065557, dated Nov. 15, 2019, 4 pages.
"Written Opinion of the International Preliminary Examining Authority", PCT Application No. PCT/US2018/049403, dated Oct. 25, 2019, 8 pages.
"Foreign Office Action", European Application No. 18830637.7, dated Jul. 7, 2020, 7 pages.
"International Preliminary Report on Patentability", PCT Application No. PCT/US2018/041696, dated Jun. 18, 2020, 14 pages.
"International Preliminary Report on Patentability", PCT Application No. PCT/US2018/065829, dated Jun. 25, 2020, 20 pages.
"International Preliminary Report on Patentability", PCT Application No. PCT/US2018/065557, dated Jun. 25, 2020, 29 pages.
"Notice of Allowance", U.S. Appl. No. 15/844,093, dated May 13, 2020, 11 Pages.
"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.
"International Search Report and Written Opinion", PCT Application No. PCT/US2018/049403, dated Jan. 16, 2019, 21 pages.
"International Search Report and Written Opinion", PCT Application No. PCT/US2018/067367, dated Mar. 20, 2019, 19 pages.
"Invitation to Pay Additional Fees", PCT Application No. PCT/US2018/065557, Mar. 13, 2019, 19 pages.
"Invitation to Pay Additional Fees", PCT Application No. PCT/US2018/065829, Mar. 15, 2019, 13 pages.
"Non-Final Office Action", U.S. Appl.No. 15/832,395, dated Feb. 27, 2019, 18 pages.
"Non-Final Office Action", U.S. Appl. No. 15/842,241, dated Mar. 11, 2019, 12 pages.
"Notice of Allowance", U.S. Appl. No. 15/852,572, dated Mar. 11, 2019, 5 pages.
"Pre-Interview Communication", U.S. Appl. No. 15/842,318, dated Mar. 29, 2019, 4 pages.
"Corrected Notice of Allowance", U.S. Appl. No. 15/844,093, dated Dec. 9, 2020, 3 pages.
"Notice of Allowance", U.S. Appl. No. 15/844,093, dated Sep. 16, 2020, 10 Pages.
"Non-Final Office Action", U.S. Appl. No. 15/844,093, dated Jan. 4, 2021, 12 pages.

* cited by examiner

NARROW-BAND COMMUNICATION

BACKGROUND

Many computing and electronic devices include a transceiver for communicating over a wireless network. Wireless networks are typically managed by a managing node or access point which manages communication within that wireless network. To do so, the managing node often allocates or assigns physical access of wireless spectrum to each device associated with the network. This physical access can be assigned to each of the devices as uniform units of frequency or time. With advances in wireless standards and increasing data rates, network-specified allocations of physical access have become extremely wide, with some bandwidth allocations spanning up to 1 gigahertz (GHz) of physical access.

While these wide-band allocations of physical access support the increased data rates desired by many users, supporting wide-band communication can adversely impact operation of transceiver hardware within a device. For example, to receive wide-band communications, a greater receiver bandwidth is needed, along with higher sampling rates for gain control, demodulation functions, and other communication functions. On the transmitter side, spreading transmit power across a wide frequency range lowers power-amplifier efficiency, particularly when attempting to communicate over longer distances. As such, operating a device transceiver in wide-band communication modes often increases power consumption of the transceiver hardware and lowers power efficiency of the device. This increased power consumption may also negatively affect a user experience, particularly with battery-powered devices that may suffer from reduced run-times or fallback to low-performance modes of operations due to a reduced battery level.

SUMMARY

This document describes techniques for, and systems that enable, a narrow-band communication mode for wireless networks, such as communication between a user device and base station of a wireless network. In some aspects, the techniques include enabling the base station to implement a narrow-band communication scheme for communicating with a user device using fewer than all resource elements or subcarriers of a resource block. For example, narrow-band communication may be implemented with one or more resource elements spanning 15 kHz of bandwidth, instead of typical wide-band allocations of 100 MHz to 1 GHz of bandwidth. Furthermore, the techniques may include enabling the base station to implement a narrow-band communication scheme using fewer than all resource elements of a subcarrier within the resource block.

These techniques and systems may be implemented in wireless networks that implement various wide-band (e.g., 100 MHz to 1 GHz) communication protocols, such as a 4th generation (4G) Long Term Evolution (LTE) wireless network, an LTE advanced wireless network, or a 5th generation (5G) new radio (NR) wireless network. Additionally, these techniques and systems may be particularly beneficial in an advanced cellular network protocol, such as the 5G NR system in which wireless communication is performed over a resource block having a relatively wide bandwidth and an increased quantity of resource elements. Because each resource element facilitates communication of a predetermined amount of bandwidth for a time interval, the 5 G NR system allows for an increased amount of data communicable over each resource block for a time interval.

In some aspects, the narrow-band communication mode may be initiated by the base station based on receiving an indication of a state of the user device. For example, the user device may determine that it is in a low-power state responsive to a charge level of a battery of the user device falling below a threshold level. The user device can then communicate, to the base station, a request to enter the narrow-band communication mode. In other implementations, the user device may determine that it is in a low signal-quality state responsive to a signal-quality of a wireless link with the base station being below a threshold level (e.g., a predefined or adaptive threshold). The user device may then communicate, to the wireless communication base station, a request to enter the narrow-band communication mode. In further implementations, the user device receives an input (e.g., user input) indicating a selection to enter the narrow-band communication mode. The user device can then communicate, to the wireless communication base station, a request to enter the narrow-band communication mode. In response to one or more of these requests, a resource allocation entity of a base station may allocate, from a resource block of physical access, one or more resource elements that correspond to one or more subcarriers of the resource block. Accordingly, the base station may allocate a little as 15 kHz of bandwidth from the resource block by which to implement narrow-band communication between the user device and base station.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of narrow-band communication for wireless networks is described below. The use of the same reference numbers in different instances in the description and the figures may indicate like elements.

DETAILED DESCRIPTION

Figure 1:
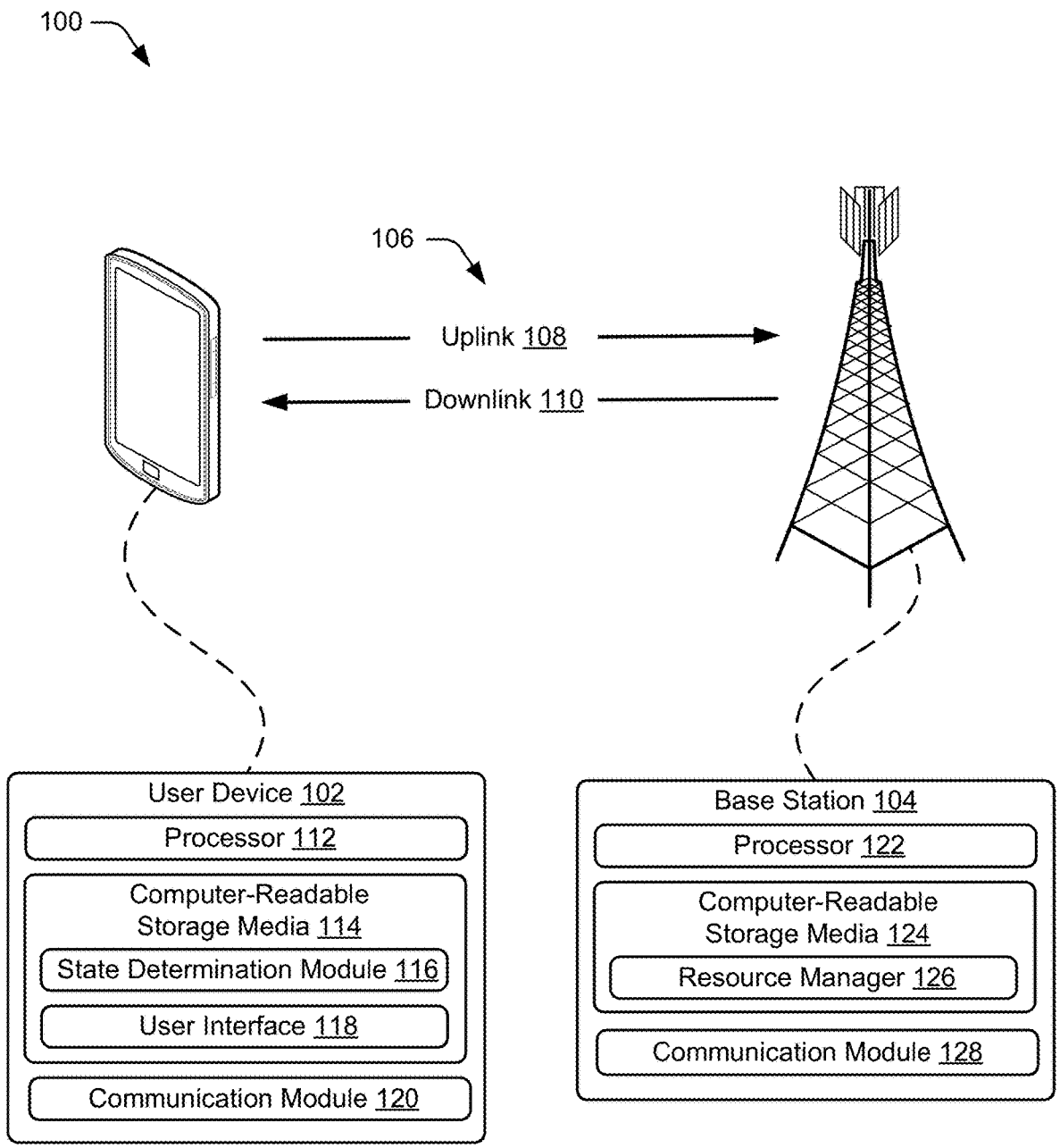
FIG. 1 illustrates example device configurations of a user device and a base station in accordance with one or more aspects of narrow-band communication.

Generally, a base station of a wireless network allocates a spectrum of wireless network channels to user devices via a resource manager of wireless network resources. The spectrum of the wireless network may be divided into various units of bandwidth, frequency, or time, such as resource blocks that include a predefined number of subcarriers or resource elements. The resource manager typically dedicates all subcarriers and resource elements of one of these resource blocks to support communication with a single user device. Dedicating all of the subcarriers and resource elements of a resource block to a single user device, however, can result in high battery usage rates and relatively low power-to-resource-element ratios. For example, in many advanced communication protocols, a bandwidth of resource blocks may be greater than previous wireless communication protocols, thus increasing battery usage and potentially decreasing a power-to-resource element ratio when transmit power is spread across the increased bandwidth. Additionally, a 5 G NR wireless communication protocol may operate at relatively high frequencies (above 2 GHz), which are less effective for penetrating barriers (e.g., walls) and other objects that may reside between the base station and user device. As such, a user experience may be diminished when a wireless transceiver of the user device drains a battery of the device quickly and apparent range of the base station is limited over longer distances and/or through barriers, such as walls or other obstacles.

Therefore, it may be advantageous to provide a narrow-band communication mode that provides more-efficient use of network resources for communication between a user device and a base station of a wireless network. In some aspects of narrow-band communication, a user device determines a state of the user device, such as a low-charge battery state or a low signal-quality state. The user device may then transmit to a base station, such as a next generation Node B (gNB, e.g., for 5 G NR), a request to enter the narrow-band communication mode. The user device receives, from the base station, an identification of selected resource elements for communication in the narrow-band communication mode. The identification may include respective frequencies and time locations of the selected resource elements that include a portion, but not all, resource elements or subcarriers of a resource block. By communicating in the narrow-band communication mode with fewer than all resource elements or subcarriers of the resource block, the user device can conserve battery and improve signal quality through an increased power-to-resource element ratio.

In other aspects, a base station can receive one of the above-referenced requests from a user device. Based on this request, the base station may determine a quantity of resource elements of a resource block to allocate for communication with the user device. The base station then selects, from a subcarrier of the resource block, the determined quantity of resource elements that include a portion, and not all, of the subcarrier of the resource block. To initiate the narrow-band mode, the base station transmits, to the user device, an identification of the selected resource elements that includes respective frequencies and time locations of the selected resource elements in the resource block. These are but a few aspects of narrow-band communication, which may be described further and/or with other various aspects throughout this disclosure.

The following discussion describes an operating environment, an example networking environment in which devices of the operating environment may be implemented, and techniques that may be employed in the operating environment and/or network environment. In the context of the present disclosure, reference is made to the operating environment or networking environment by way of example only.

Operating Environment

FIG. 1 illustrates an example operating environment 100 in which devices for narrow-band communication can be implemented. In this example, the operating environment includes a user device 102 and a base station 104 that are respectively configured to communicate over a wireless link 106 of a wireless network. Generally, the wireless link 106 includes an uplink 108 by which the user device 102 transmits data or information to the base station 104 and a downlink 110 by which the base station 104 transmits other data or other information to the user device 102. The wireless link 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol (e.g., 4 G), an LTE Advanced protocol, 5 G NR, or the like. Although shown or described with reference to a separate uplink 108 or downlink 110, communication between the user device 102 and base station 104 may also be referred to as a wireless connection, wireless association, frame exchange, communication link, or the like.

The user device 102 includes a processor 112, computer-readable storage media 114 having a state determination module 116 and a user interface 118, and a communication module 210. The user device 102 is illustrated as a smart phone, however the user device may instead be implemented as any device with wireless communication capabilities, such as a mobile gaming console, a tablet, a laptop, an Advanced Driver Assistance System (ADAS), a point-of-sale (POS) terminal, a health monitoring device, a drone, a camera, a media-streaming dongle, a wearable smart-device, an Internet-of-Things (IoT) device, a personal media device, a navigation device, a mobile-internet device (MID), a wireless hotspot, a femtocell, or a broadband router.

The processor 112 of the user device 102 can execute processor-executable instructions or code stored by the computer-readable storage media (CRM) 114 to cause the user device to perform operations or implement various device functionalities. In some cases, the processor 112 is implemented as an application processor (e.g., multicore processor) or a system-on-chip with other components of the user device integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the user device 102 is implemented as hardware-based storage media, which does not include transitory signals or carrier waves. In some cases, the CRM 114 stores firmware, an operating system, and/or applications of the user device 102 as instructions, code, or information. The instructions or code can be executed by the processor 112 to implement various functionalities of the user device 102, such as those related to a user interface, network access, or audio encoding features. In this example, the CRM 114 also stores processor-executable code or instructions for implementing the state determination module 116 and/or the user interface 118 the user device 102.

In some aspects, the state determination module 116 may determine a state or condition of the user device 102 relative to one or more criteria, such as a battery state, a signal-quality state, or a selected state as further described throughout the disclosure. The user interface 118 may provide a notification of one or more determined states of the user device 102. Additionally or alternatively, the user interface 118 may provide a menu for receiving a selection of a state of the user device 102. Furthermore, the user interface 118 may provide a notification that a request to enter a narrow-band communication mode is, or has been, sent to the base station 104. These are but a few implementations of the state determination module 116 and user interface 118, which are described further or with other aspects throughout the disclosure.

The communication module 120 of the user device 102 includes a receiver, a transmitter, and associated circuitry or other components for communicating with the base station 104 via a wireless medium. For example, the communication module 120 may transmit, via the transmitter, data or information to the base station 104 via the uplink 106. This data or information transmitted to the base station 102 may include any suitable type of framed or packetized information, such as device status information, wireless link status information, wireless link control information, data requests, data, network access requests, or the like. The communication module 120 may also receive, via the receiver, other data or other information from the base station 104, such as wireless link configuration settings, network control information, or communication mode selection.

In this example, the base station 104 is shown generally as a cellular base station of a wireless network. The base station 104 may be implemented to manage a cell of a wireless network that includes multiple other base stations that each manage another respective cell of the wireless network. As such, the base station 104 may communicate with a network management entity or others of the multiple base stations to coordinate connectivity or hand-offs of mobile stations within or across the cells of the wireless network. The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), or a next generation Node B (gNB, e.g., for 5 G NR), or the like. As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a resource manager 126, and a communication module 128. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, SRAM, or Flash memory. In the context of this discussion, the CRM 124 is implemented as hardware-based storage media, which does not include transitory signals or carrier waves. The CRM 124 of the base station 104 may store firmware, an operating system, or applications of the base station as instructions, code, or other information. The instructions or code can be executed by the processor 122 to implement various functionalities of the base station 104, such as to manage connectivity or parameters of the wireless link 106 with the user device 102. In this example, the CRM 124 also stores processor-executable code or instructions for implementing the resource manager 126 of the base station 104.

In some aspects, the resource manager 126 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of bandwidth, time, carriers, symbols, or the like. For example, within a framework of the LTE protocol, the resource manager 126 can allocate bandwidth and time intervals of access in resource blocks, each of which can be allocated in whole, or in part, to one or more mobile stations communicating with the base station 104.

These resource blocks can be divided into, or include, subcarriers, where each subcarrier (i) spans a portion of the specified bandwidth and (ii) includes an amount of time or number of symbols corresponding to a subinterval of a specified length of the resource block. With reference to the LTE protocol, a resource block may span a bandwidth of 180 kilohertz (kHz) for an interval of one-half of a millisecond (ms) or seven orthogonal frequency-division multiplexing (OFDM) symbols. The frequency span (e.g., carrier) of a resource block (RB) may include 12 subcarriers, such that a subcarrier spans a bandwidth of 15 kHz (12×15 kHz=180 kHz), and a resource block (RB) of 12 subcarriers, that each include 7 OFDM symbols, provides for 84 resource elements (REs) of one symbol per subcarrier. By extension, a subframe of one ms (e.g., twice that of an RB), each tone or subcarrier may include 14 resource elements over frequency and time of the subframe.

In some aspects, the resource manager 126 of the base station 104 may implement narrow-band communication with the user device 102 by allocating, from a resource block, a number of resource elements or subcarriers to the user device. The number or quantity of resource elements to allocate can be determined based on a state of the user device 102 or an amount of bandwidth requested by the user device. The resource manager 126 may then select, from a resource block, the determined number of resource elements for allocation to the user device 102 to facilitate narrow-band communication. In a narrow-band communication mode, the selected resource elements may include a portion, but not all, of a resource block (e.g., a wide-band resource block). For example, the portion of the resource block may include a portion (e.g., symbols), but not all, of a subcarrier of the resource block. Alternately or additionally, the selected resource elements may include another subcarrier of the resource block or a portion, or all of, another resource block, such as the other resource block.

The resource manager 126 can also communicate, to the user device 102, an identification of the selected resource elements for narrow-band communication via the downlink 110. The identification may include one or both of frequencies or time locations of respective resource elements of the selected resource elements. The one or both of frequencies or time locations may be effective to enable the user device 102 to communicate in a narrow-band mode via the selected resource elements. In such an instance, the indication may be communicated from the base station 104 to the user device 102 as part of a Radio Resource Control (RRC) message or Downlink Control Information (DCI) message.

The communication module 128 of the base station 104 includes a receiver, a transmitter, and associated circuitry or other components for communicating with the user device 102 via the wireless medium. In some cases, the communication module 128 includes or is coupled with multiple transceivers and antenna arrays that are configured to establish and manage wireless links with multiple user devices or mobile stations. The base station 104 may communicate any suitable data or information to the user device 102 (or other mobile stations) through the downlink 110, such as a schedule of allocated resource elements, data, wireless link status information, wireless link control information, or the like.

Figure 2:
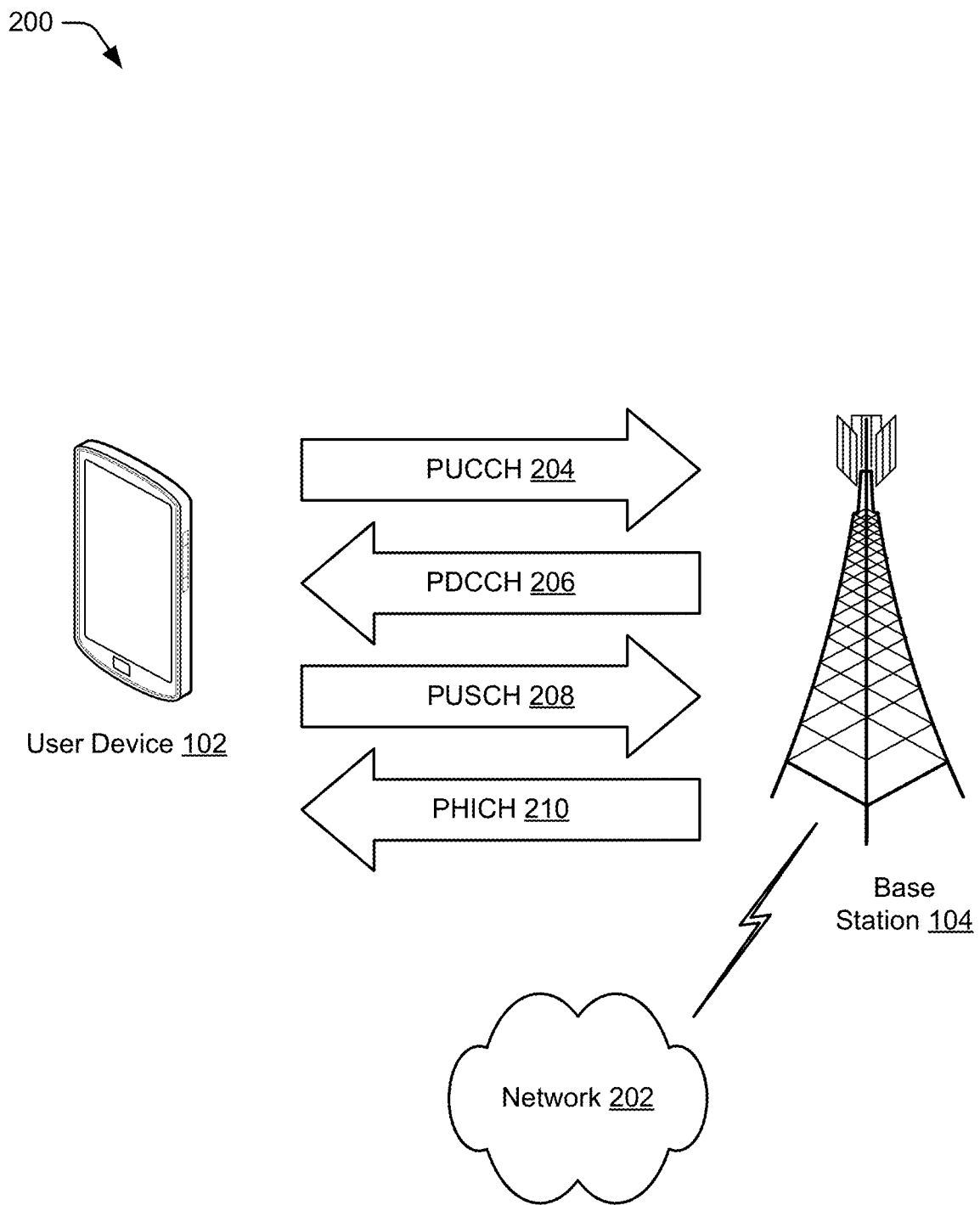
FIG. 2 illustrates an example networking environment in which the user device and base station may communicate in accordance with one or more aspects.

FIG. 2 illustrates an example networking environment 200 in which a user device and a base station may communicate in accordance with one or more aspects. The network environment includes respective instances of the user device 102 and the base station 104, which provides a wireless network with which the user device 102 and other mobile stations may associate. Through the wireless network, the base station 104 may enable or provide access to other networks or resources, such as a network 202 (e.g., the Internet) connected via a backhaul link (e.g., fiber network). Alternately or additionally, the networking environment 200 may include other base stations or a network management entity to provide an area wide wireless network, such as a 5 G NR network and associated data services.

The user device 102 and/or the base station 104 may communicate through any suitable type or combination of channels, message exchanges, or network management procedures. In this example, the user device communicates to the base station 104 via a physical uplink control channel (PUCCH) 204. The PUCCH 204 may be useful to transmit, to the base station 104, one or more of hybrid automatic repeat requests (HARQ) acknowledge/not acknowledge (ACK/NACK), channel quality indicators (CQI), multiple-input-multiple-output (MIMO) feedback such as a rank indicator (RI) or a precoding matrix indicator (PMI), scheduling requests for uplink transmission, or binary phase-shift keying (BPSK) or quadrature phase-shift keying (QPSK) for PUCCH modulation.

The base station 104 may communicate, via a physical downlink control channel (PDCCH) 206, with the user device 102 via the PUCCH 204. The PDCCH 206 can be used by the base station 104 to communicate downlink control information (DCI) and/or a Radio Resource Control (RRC) to the user device 102. In some aspects, the DCI includes identification of resource elements to be used for communication of data to the user device 102. The DCI may also include a modulation scheme and coding/decoding information for the user device 102 to access the data communicated to the user device 102.

The user device 102 may send additional data or other information to the base station 104 via a physical uplink shared channel (PUSCH) 208. The PUSCH 208 includes radio resource control (RRC) communications, uplink control information (UCI) messages, and application data. The PUSCH 208 is typically the channel on which application data is transmitted from the user device 102 to the base station 104. Alternately or additionally, the base station 104 may send additional data to the user device 102 via a physical HARQ indicator channel (PHICH) 210. The PHICH 210 includes acknowledgements or lack of acknowledgements for data received from the user device 102 via the PUSCH 208.

In some aspects of narrow-band communication, the user device 102 may transmit request to enter a narrow-band communication mode via the PUCCH 204 or the PUSCH 208. For example, the request to enter the narrow-band communication mode may be provided as a unique communication, a portion of a preamble, or medium access control (MAC) layer of a communication packet. The request to enter the narrow-band communication mode may also include an indicator of a state of the user device 102, such as a battery charge level or a signal-quality level.

In the context of narrow-band communication, the resource manager 126 may communicate, to the user device 102, an identification of the selected resource elements via the PDCCH 206 or the PHICH 210. In some cases, the identification of selected resource elements includes respective frequencies and symbols of a resource block by which the user device 102 is to communicate with the base station 104. In such cases, the identification of the selected resource elements may be communicated as part of a Radio Resource Control (RRC) message or Downlink Control Information (DCI) message via the PDCCH 206 or the PHICH 210. Further, the identification of the selected resource elements may be communicated to the user devices as a portion of a preamble, MAC layer message, or another communication packet (e.g., a PDCCH message).

Figure 3:
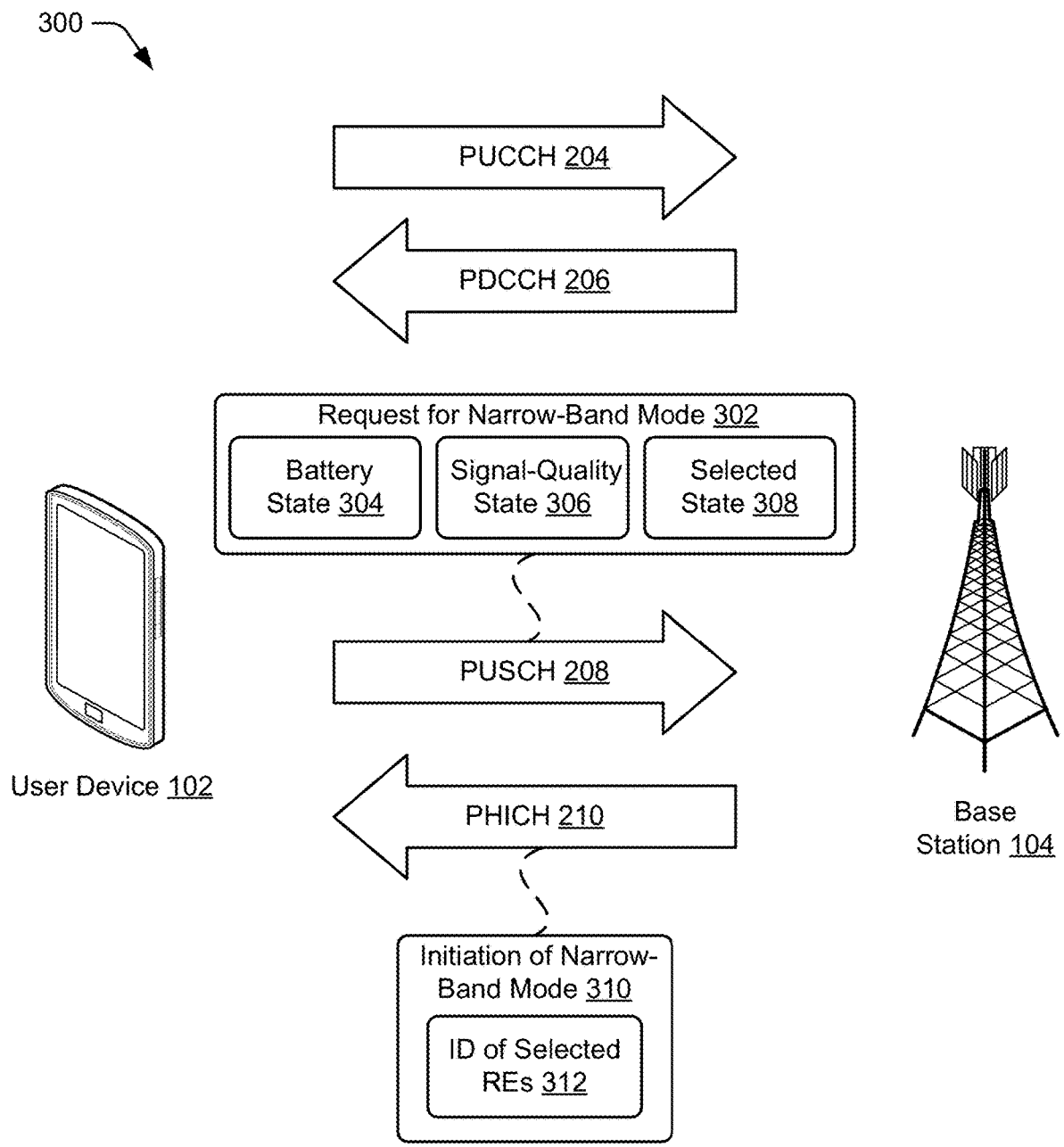
FIG. 3 illustrates an example of network communication or operations in accordance with one or more aspects of narrow-band communication.

FIG. 3 illustrates example of network communication or operations at 300 in accordance with one or more aspects of narrow-band communication. In this example, the user device 102 communicates a request for narrow-band mode 302 to the base station 104 via one of the PUCCH 204 (not shown) or the PUSCH 208 (as shown). With reference to FIG. 1, the state determination module 116 may determine a state of the user device 102 and include an indication of the state of the user device as part of the request for narrow-band mode 302. For example, the determination module 116 may determine a battery state 304 of a battery of the user device 102 and include an indication of the battery state 304 in the request for narrow-band mode 302. In some cases, the battery state 304 may be a low-charge battery state based on a charge level of the battery being below a threshold of charge. Alternatively, the battery state 304 may be a high-charge battery state based on a charge level of the battery being above the threshold of charge. In some implementations, multiple thresholds of charge are used to distinguish multiple battery states. The threshold of charge may be based on, for example, a charge of the battery compared to a charge capacity of the battery. Alternatively, the threshold of charge may be based on an estimated amount of time until the charge of the battery is below an operational level. In some implementations, the threshold of charge is based on a raw amount of charge stored in the battery.

Alternately or additionally, the state determination module 116 determines the state of the user device 102 based on a signal-quality state 306 of the wireless link 106 or communications with the base station 104. In such cases, an indication of the signal-quality state 306 can be included in the signal-quality state 306 transmitted to the base station 104. The signal-quality state 306 may be a low signal-quality state based on a reference signal received power (RSRP), a received signal strength indicator (RSSI), and/or a reference signal received quality (RSRQ) being below a threshold value. In some implementations, multiple thresholds are used to distinguish multiple signal-quality states.

In other cases, the state determination module 116 determines the state of the user device 102 based on a selected state 308 of the user device 102, such as a mode selection received via the user interface 118. For example, the user device may receive input requesting to enter a power saving mode or a signal amplification mode. Alternatively, the provided input may directly request entering a narrow-band communication mode. This selected state 308 can also be transmitted to the base station 104 as part of the request for narrow-band mode 302.

Based on the request for narrow-band mode 302, the resource manager 126 can determine a state of the user device 102 and/or a quantity of resource elements to allocate for communication with the user device 102. For example, the resource manager 126 of the base station 104 may select, from a resource block, a determined quantity of resource elements based on the indicated state of the user device 102. The selected resource elements may include a portion, but not all resource elements, of the resource block. Further, the selected resource elements may include a portion, but not all, of a subcarrier of the resource block. Alternately or additionally, the selected resource elements may include all, or a portion (e.g., resource elements), of another resource block.

As part of an initiation of the narrow-band communication mode 310 (initiation of narrow-band mode 310), the base station 104 may transmit an identification of selected resource elements 312 (ID of selected REs) 124. The identification of selected resource elements 124 may be includes as a part of an RRC message or a DCI message transmitted via the PDCCH 206. The user device 102 may use the identification of selected resource elements 124 to configure the communication module 120 for communication with the base station 104 via the selected resource elements for narrow-band communication.

Figure 4:
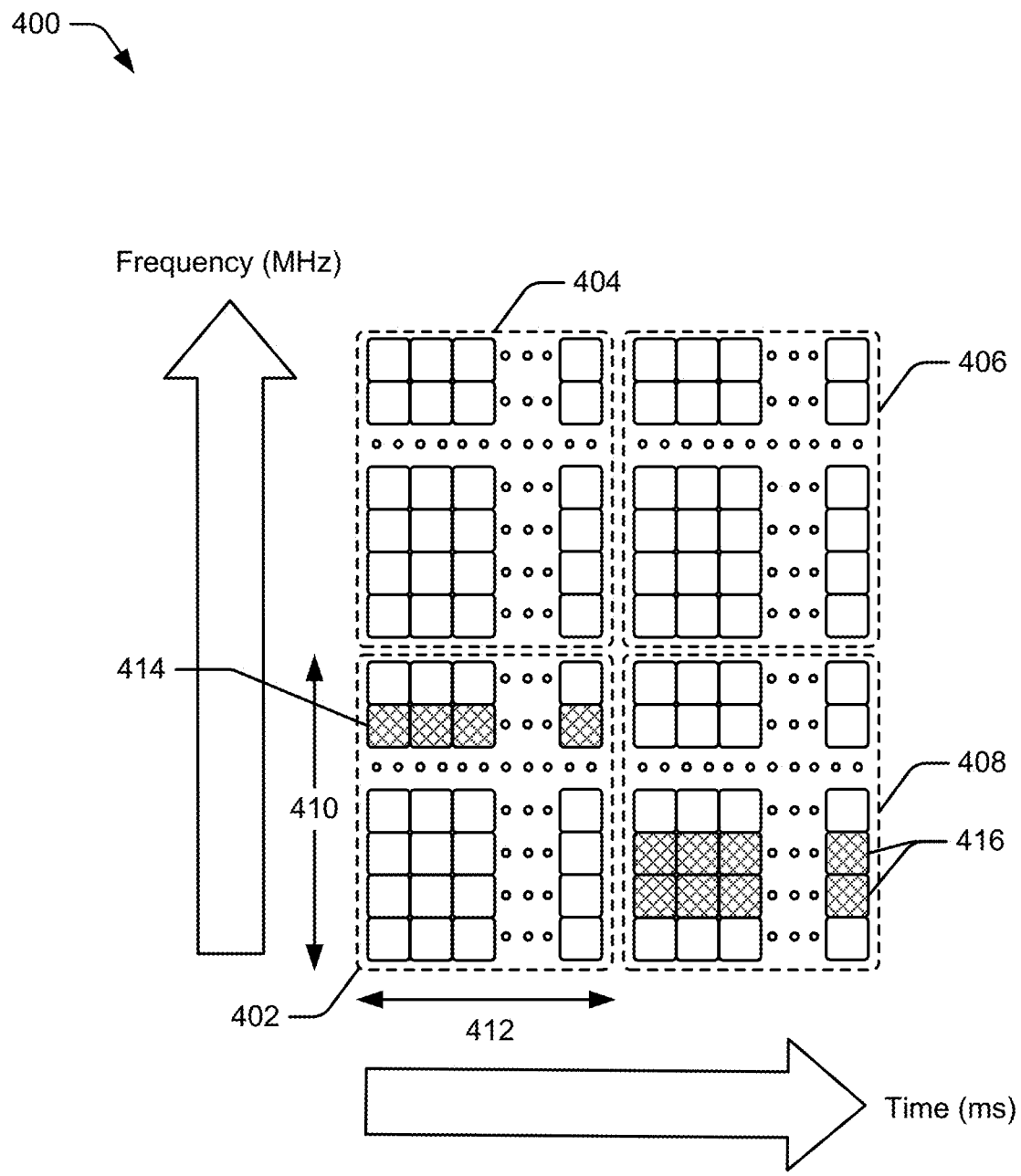
FIG. 4 illustrates an example set of resource blocks available to a base station for communication with one or more user devices.

FIG. 4 illustrates an example set 400 of resource blocks available to the base station 104 for communication with one or more user devices of a wireless network. The set 400 of resource blocks includes a first resource block 402, a second resource block 404, a third resource block 406 and a fourth resource block 408. The wireless communication resource block 402, as defined by a communication protocol or standard, may span any suitable specified frequency range 410 and/or specified time interval 412. For example, each resource block 402 through 408 may span approximately 180 KHz of bandwidth and a time slot of approximately one-half millisecond or 7 OFDM symbols.

In some aspects of narrow-band communication, the resource manager 126 of the base station 104 may determine a quantity of resource elements (or subcarriers) of one or more of the resource blocks 402 through 408 to allocation to user device 102 for narrow-band communication. Based on the determined quantity, the resource manager 126 can select resource elements from one or a combination of the resource blocks 402, 404, 406, and/or 408 for communicating with the user device 102. For example, the resource manager 126 may select a portion, but not all, of the resource block 402, such as a subcarrier 414 of the resource block 402 for narrow-band communication.

Alternately or additionally, the resource manager 126 may select all resource elements of two other subcarriers 416 of another resource block 404 as part of a subcarrier hopping scheme of narrow-band allocations over time. In some cases, the hopping scheme or allocation scheme can use or be based on a cell radio network temporary identifier (C-RNTI) that provide a unique UE identification at the cell level for identifying an RRC connection or wireless link between the user device 102 and the base station 104. The RE allocations and/or hopping schemes may be applied to sub-6 GHz band or mm Wave bands of 5 G NR carriers, such as those in the 28 GHz or 39 GHz ranges. For time division duplex (TDD) systems in (e.g., 5 G NR) RE assignment or allocations for uplinks and downlinks can be aligned to a center frequency as an optimization or to simplify transceiver design and/or implementation.

The resource manager 126 may also allocate all or portions of the resource blocks 402, 404, 406, and 408 to other mobile stations. Ultimately, and based on optimization algorithms that may be implemented by the resource manager 126, the resource manager 126 may allocate, at various granularities, portions (e.g., resource elements or subcarriers) of the resource blocks 402, 404, 406, and 408, to the user device 102 and other mobile stations based on a state of the user device 102, respective states of the other mobile stations, and/or other network conditions.

For example, if the user device 102 is in a low-signal-quality state, the resource manager 126 of the base station 104 may allocate one or two subcarriers (e.g., 15 KHz or 30 KHz) of a resource block to the user device 102 for communication. By doing so, a limited amount of power available for communication at the user device 102 can be focused across less bandwidth of physical channel access. Thus, reducing a portion or bandwidth of the resource block used for communication can cause an increase in power-to-resource element ratio, thereby increasing a range of the narrow-band communication signals.

Alternately or additionally, if the user device 102 is in a low-charge battery state, the resource manager 126 of the base station 104 may allocate, to another user device, a portion of the resource block not used for communication with the user device 102. By doing so, the resource manager 126 is able to efficiently manage communication with multiple user devices or mobile stations by subdividing a resource block into groups or partitions of resource elements, where a quantity of resource elements in the groups can be based on respective states of the user devices.

Figure 5:
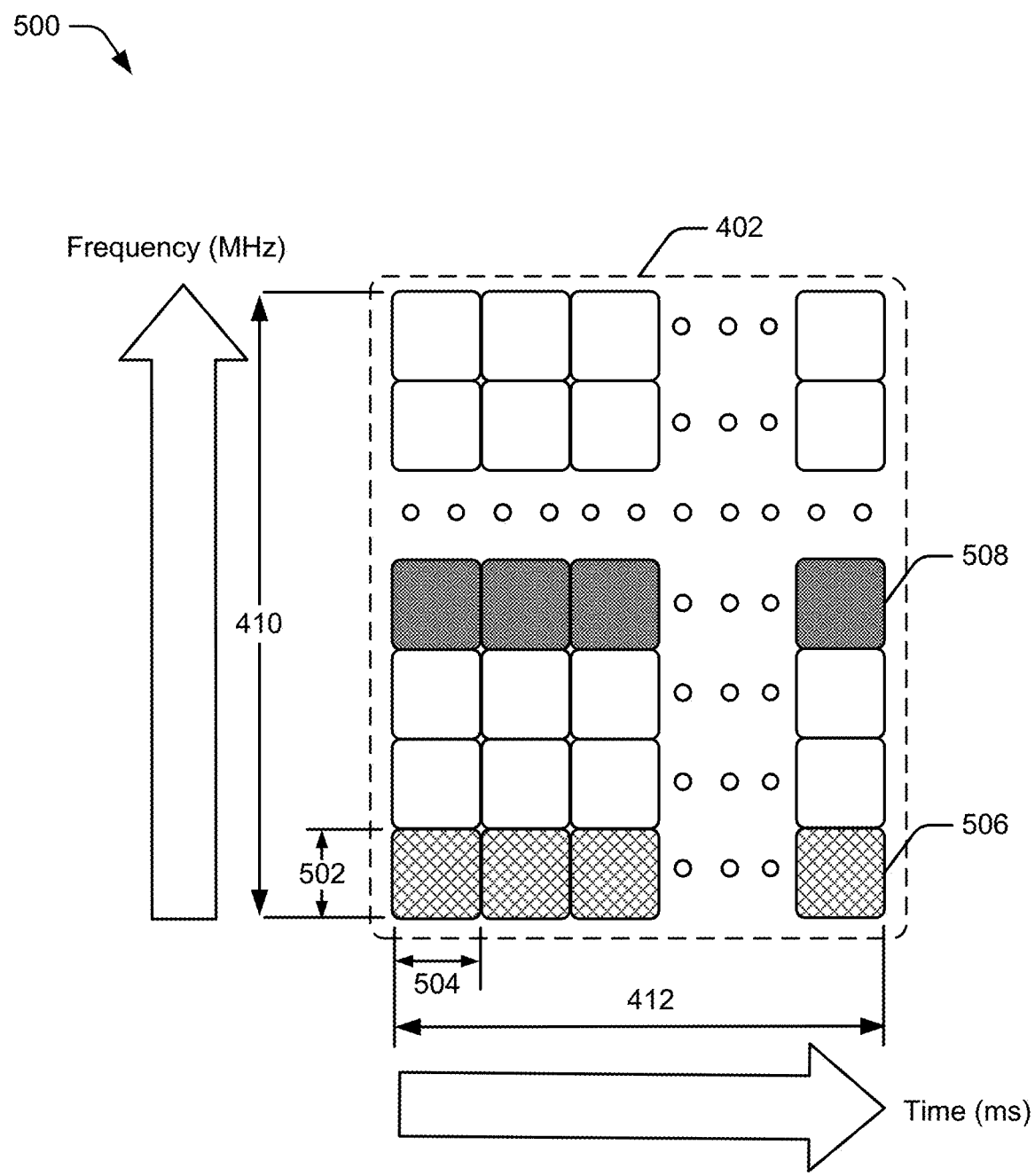
FIG. 5 illustrates a detailed example of a resource block that may be implemented as one of the resource blocks of FIG. 4.

FIG. 5 illustrates a detailed example of the resource block at 500, which may be implemented similar to or differently from the resource block 402 as shown in FIG. 4. In this example, the resource block 402 includes a plurality of subcarriers that each span a portion of the specified frequency range 410. For example, a subcarrier 506 may span a 15 kHz portion 502 of the specified frequency range 410 (e.g., 180 kHz) of the resource block 402. Each subcarrier is divided into a plurality of resource elements (illustrated as blocks), that correspond to a symbol or subinterval 504 of the specified time interval 412. For example, a resource element 506 of the subcarrier 506 may correspond to a last subinterval or symbol of the specified time interval 412 or time slot of the resource block 402.

In accordance with various aspects of narrow-band communication, the resource manager 126 of the base station 104 may select subcarriers or resource elements of the resource block 402 on a granular level by which the user device 102 can communicate in a narrow-band mode. The resource manager 126 may select one or a few, but not all, subcarriers of the resource block 402 for narrow-band communication. For example, the resource manager 126 may select one subcarrier 506 of 15 kHz for use in narrow-band communication, instead of a wide-band frequency allocation of an entire resource block (e.g., 180 kHz) or multiple resource blocks (e.g., 1 GHz). With other subcarriers of the resource block 402 available, the resource manager may also allocate a subcarrier 508 to a different mobile station for narrow-band communication, thereby enabling communication with two mobile stations through one resource block. As such, narrow-band communication and the allocation of subcarriers of a resource block can be extended to any suitable number of mobile stations effective to increase communicative efficiency of the base station 104. Alternatively, the resource manager 126 may select one or more subcarriers of another resource block, such as a next resource block as part of a frequency hopping scheme implemented between the user device 102 and the base stations 104.

Figure 6:
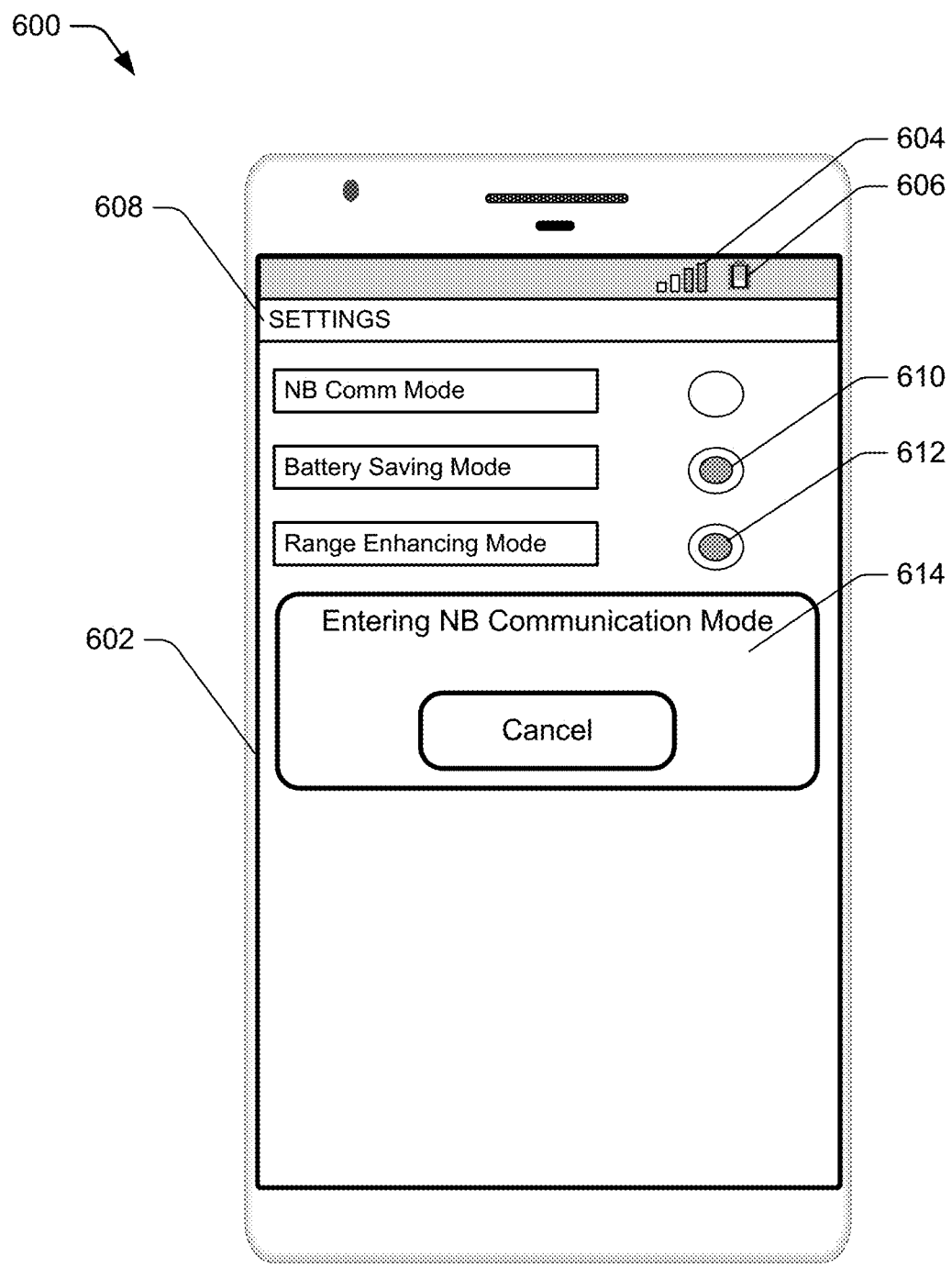
FIG. 6 illustrates an example user interface of a user device through which one or more aspects of narrow-band communication can be implemented.

FIG. 6 illustrates an example user interface 600 of the user device 102 through which one or more aspects of narrow-band communication may be implemented. In this example, the user interface 600 is presented through a visible portion of a display 602 for providing output to a user. The display 602 may also include, or be integrated with, a touch screen or touch-sensitive overlay for receiving touch input from the user. The display 602 may also display a signal-quality state indicator 604 of the user device 102 and/or a battery state indicator 606 of the user device 102. In some cases, the display 602 provides or makes accessible a settings menu 608 through which the user interface 600 can receive input to select a device state or communication mode. For example, a settings menu 608 for device and/or communications modes can receive a user selection to request one or more modes, such as a narrow-band communication mode, a battery saving mode, or a range enhancing mode.

The selection of the one or more modes can be effective to generate, via the state determination module 116, a request to enter narrow-band communication mode for transmission to the base station 104. The request may include an identification of the mode selection or bandwidth criteria, which may be used by the base station 104 to configure the narrow-band communication mode. For example, a first selection 610 requesting the battery saving mode may be used by the base station 104 to determine a quantity of subcarriers of a resource block for communication with the user device 102, leaving other subcarriers for communication with other wireless devices. Alternately or additionally, a second selection 612 requesting the range enhancing mode may be used by the base station 104 to determine a quantity of subcarriers or resource elements of a resource block to allocate for communication with the user device 102, leaving other portions of the resource block for allocation to other wireless devices.

In some implementations, the user device 102 automatically, and without user input, generates a request for narrow-band communication based on the state of the user device 102. For example, the user device 102 may determine that a battery state 304 is a low-battery state, and without user input, generate a request to enter the narrow-band communication mode for transmission to the base station 104. The displayed battery state indicator 606 may indicate, responsive to reception of a narrow-band mode allocation of a subcarrier or resource elements from the base station 104 (e.g., NB mode grant), that the user device 104 has entered the narrow-band communication mode. In other cases, the user device 102 may determine that a signal-quality state 306 is low quality, and without user input, generate a request to enter the narrow-band communication mode to increase transmission signal strength.

The displayed signal-quality state indicator 604 may also indicate to the user that the narrow-band request has been generated, transmitted, or granted by the base station 104. Alternately or additionally, a notification 614 may be provided via the user interface 600 to indicate that the request has been generated. The notification 614 is illustrated in this example as a pop-up notification in the display 602, however, other forms of notification 614 may be implemented in addition or in alternative to the pop-up notification. For example, the user device 102 may provide an audible notification, a visible notification via an LED indicator that is separate from the display 602, or a motion-based notification such as a vibration of the user device 102.

Techniques for Narrow-Band Communication

Figure 7:
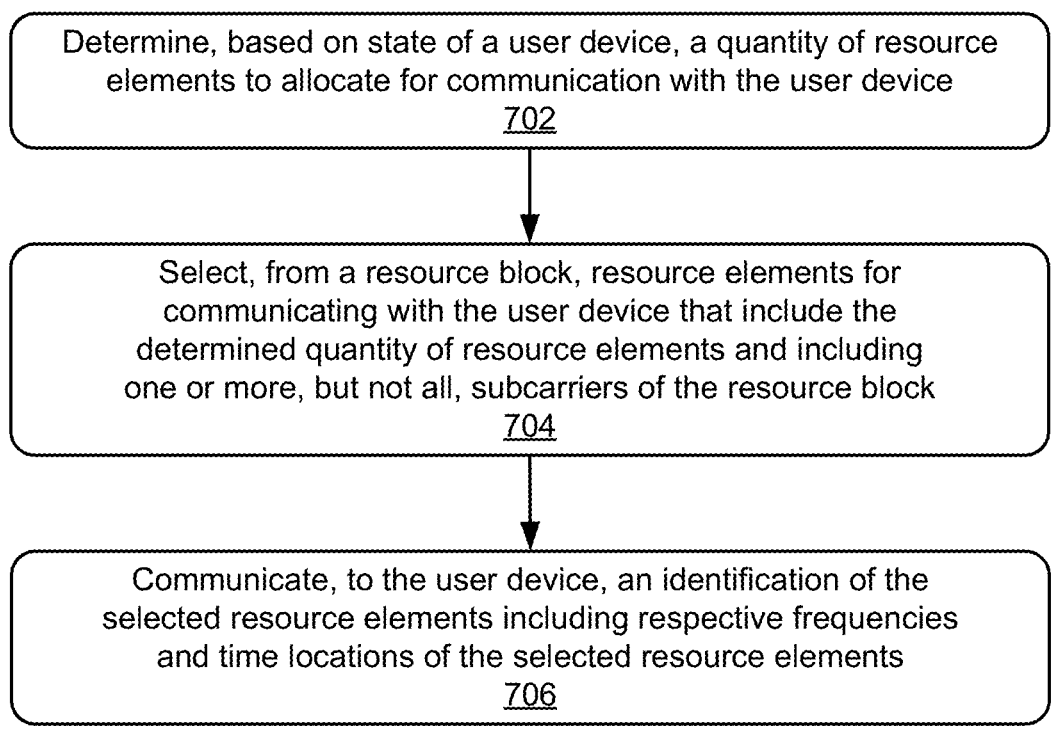
FIG. 7 illustrates an example method for initiating a narrow-band communication mode by a base station.
Figure 8:
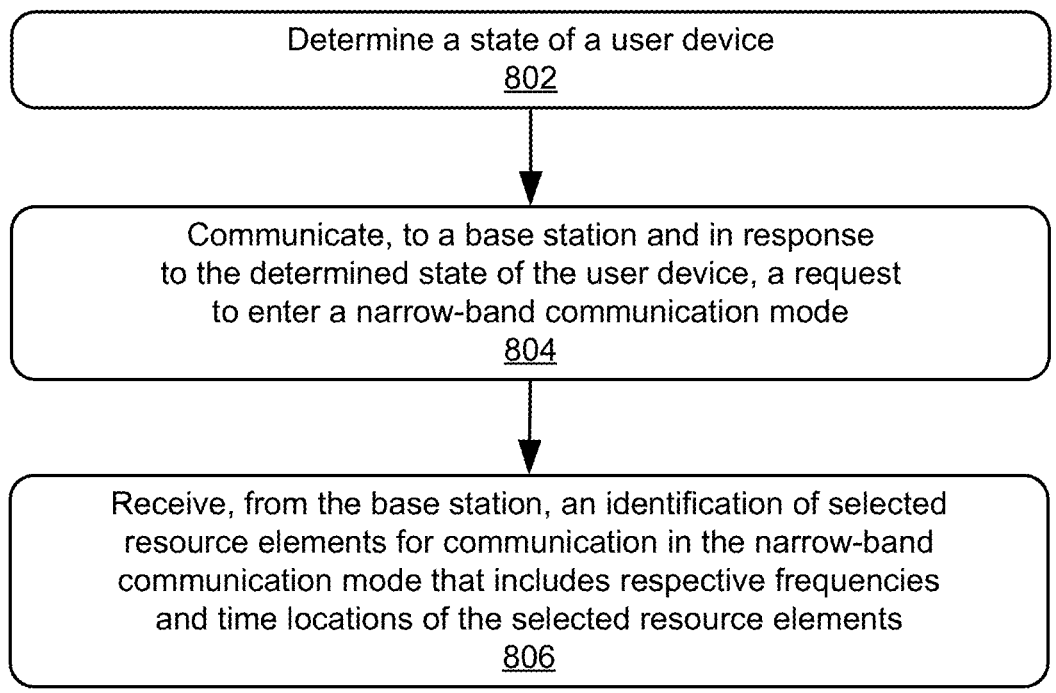
FIG. 8 illustrates an example method for entering a narrow-band communication mode based on a state of a user device.
Figure 9:
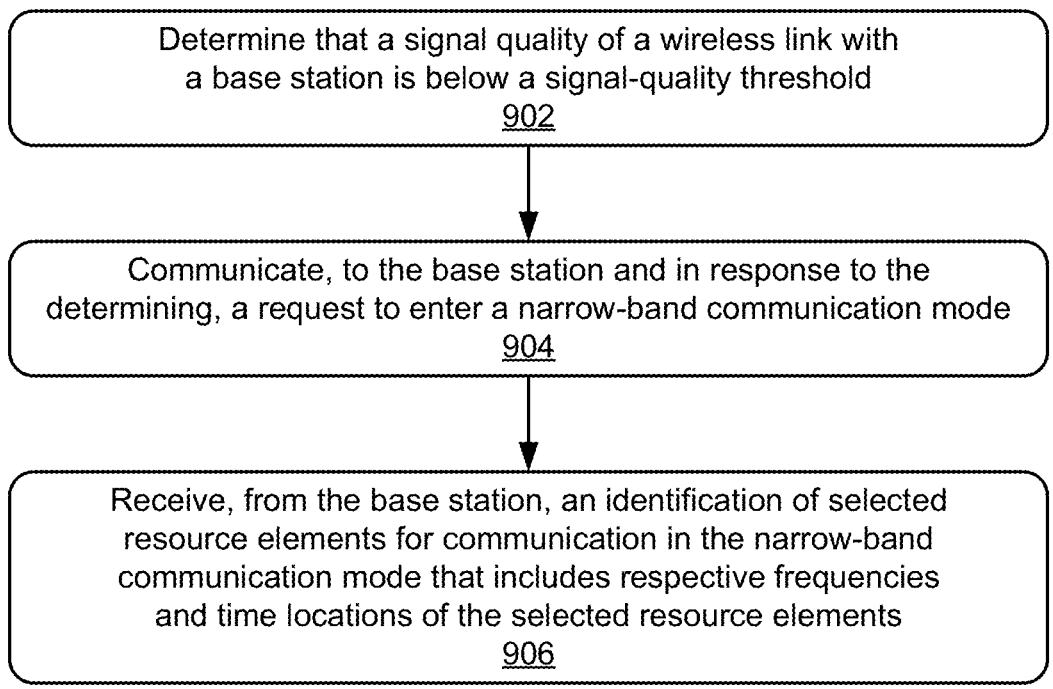
FIG. 9 illustrates an example method for entering a narrow-band communication based on signal-quality of a wireless link.

FIGS. 7-9 depict methods for implementing narrow-band communication in wireless networks. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference may be made to FIGS. 1-6, reference to which is made for example only. The techniques are not limited to performance by one entity or multiple entities operating on one device, or those described in these figures.

FIG. 7 illustrates an example method 700 for initiating a narrow-band communication mode, including operations performed by a resource manager of a base station, such as the resource manager 126. In some aspects, operations of the method 700 may be implemented to improve battery usage and/or signal-quality for a user device, such as the user device 102.

At operation 702, a quantity of resource elements of a wireless network to allocate for communication with a user device is determined. The resource elements of the wireless network facilitate communication through predetermined amounts of bandwidth and time. The quantity of resource elements or an associated number of subcarriers are determined based on a state of the user device. For example, the resource manager 126 of the base station 104 may determine the state of the user device 102 via a communication from the user device 102. The communication may be received via the PUCCH 204 or the PUSCH 208, and may include an indication of the state of the user device 102. In particular, the communication may be received as one or a plurality of semi-static communications such as an RRC communication or a MAC layer communication from the user device 102. A semi-static communication may be a periodic communication that consumes less computation and communication overhead than a dynamic communication. In some implementations, the state of the user device 102 includes a battery state 304 of the user device 102 where the battery state 304 indicates a charge of a battery of the user device 102. Additionally or alternatively, the state of the user device 102 can include a signal-quality state 306, such as a low-signal-quality state.

At operation 704, resource elements are selected from a resource block for communicating with the user device in the narrow-band mode. The selected resource elements of the resource block are based on the determined quantity of resource elements of the wireless network and include one or more, but not all, resource elements of a subcarrier of the resource block. For example, the resource manager 126 may select a few resource elements of a subcarrier (e.g., sub carriers 506 or 508), but not all, of the resource elements of the subcarrier the resource block 402. The selected resource elements of the resource block may also include some or all resource blocks of another subcarrier of the resource block or other subcarriers of a subsequent resource block. In some implementations, the selected resource elements follow a hopping pattern, where the selected resource elements vary over time. The hopping pattern may be predefined and known to both the user device 102 and base station 104, or dynamically determined by one or both of the user device 102 and the base station 104.

At operation 706, an identification of the selected resource elements of the resource block is communicated to the user device. The identification may include respective frequencies and time locations of the selected resource elements or subcarriers of the resource block. For example, the resource manager 126 can cause the communication module 128 to communicate the identification of the selected resource elements or subcarrier(s) to the user device 102 via, for instance, one of the PDCCH 206 or the PHICH 210. If the selected resource elements follow a hopping pattern, the identification may also include a designation of the hopping pattern.

FIG. 8 illustrates an example method 800 for initiating a narrow-band communication mode, including operations performed by a state determination module of a user device, such as the state determination module 116. In some aspects, operations of the method 800 may be implemented to improve battery usage and/or signal-quality for the user device 102.

At operation 802, a state of the user device is determined. For example, the state determination module 116 can determine a state of the user device 102. The state of the user device 102 may include, for instance, the battery state 304, the signal-quality state 306, or the selected state 308 as described with reference to FIG. 3 and/or throughout the disclosure. Alternately or additionally, the base station 104 may transmit a request or query effective to cause the state determination module 116 to determine the state of the user device.

At operation 804, a request to enter a narrow-band communication mode is communicated to a base station in response to the determined state of the user device. The request to enter the narrow-band communication may also include an indication of the determined state of the user device. In some cases, an indication is provided via a user interface that the request has been generated or transmitted to the base stations. Alternately or additionally, the request may be generated or transmitted by any suitable component of the user device 102. For example, the processor 112 can cause the communication module 210 to communicate the request for narrow-band communication mode 110 to the base station 104 via the uplink 108.

At operation 806, an identification of selected resource elements for communication in the narrow-band communication mode is received from the base station. The identification includes respective frequencies and time locations of the selected resource elements or subcarriers for the narrow-band communication. The selected resource elements may include a few, and not all, of a resource block. For example, the communication module 120 of the user device 102 receives, from the base station 104, an identification of the selected resource elements. The selected resource elements may include one or more, but not all, subcarriers of the resource block 402. Furthermore, the selected resource elements may include a few, but not all, subcarriers of another block, such as part of a frequency hopping scheme implemented by the resource manager 126.

Subsequent to operation 806, another state of the user device 102 may be determined wherein the other state of the user device 102 indicates a change from the previously-determined state of the user device 102. In response to the change from the previously-determined state of the user device 102, a request to exit the narrow-band communication mode may be communicated to the base station 104. By way of example, the user device 102 may communicate a request to enter the narrow-band communication mode based on a low-charge battery state. When the user device 102 is charged above a threshold amount such that the battery state 304 is no longer in a low-charge battery state, the user device 102 can then communicate, to the base station 104, a request to exit the narrow-band communication mode. Alternately or additionally, the user device 102 may receive a user input selecting that the user device 102 exit the narrow-band communication mode. In response to the user input or selection, the user device 102 can transmit a request to exit the narrow-band communication mode to the base station 104.

FIG. 9 illustrates an example method 900 for initiating a narrow-band communication mode, including operations performed by a user device, such as the user device 102. In some aspects, operations of the method 900 may be implemented to improve battery usage and/or signal-quality for the user device 102.

At operation 902, a signal-quality of a wireless link with a base station is determined to be below a signal-quality threshold. For example, the state determination module 116 can query the communication module 120 for a signal-quality metric, such as an RSRP, an RSSI, and/or a RSRQ associated with the wireless link 106 with the base station 104. Based on the signal-quality metric, the state determination module 116 may determine that a signal-quality state 306 of the wireless link 106 is a low signal-quality state. Alternately or additionally, the user device 102 may receive an indication of low signal-quality or weak signal strength from the base station 104.

At operation 904, a request to enter a narrow-band communication mode is communicated to a base station in response to the determining the low signal-quality of the wireless link. For example, the processor 112 can cause the communication module 210 to communicate the request for narrow-band communication mode 110 to the base station 104 via the uplink 108. Alternately or additionally, the request to enter the narrow-band mode can be transmitted responsive to other user device state determinations or user selection.

At operation 906, an identification of selected resource elements for communication in the narrow-band communication mode is received from the base station. The identification includes respective frequencies and time locations of the selected resource elements or subcarriers. The selected resource elements may include a few, and not all, subcarriers of a resource block. For example, the communication module 120 of the user device 102 receives, from the base station 104, an identification of the selected resource elements of the resource block 402. The selected resource elements may include one or more, but not all, subcarriers, such as the subcarrier 506 or 508, of the resource block 402. Furthermore, the selected resource elements may include a portion, but not all, resource elements of the one or more other subcarriers. Additionally, the selected resource elements may include other resource elements or other subcarriers of another resource block.

Subsequent to operation 906, another signal-quality state of the user device 102 may be determined wherein the other signal-quality state of the user device 102 indicates a change from the previously-determined signal-quality state 306 of the user device 102. Additionally or alternatively, the user device 102 may receive a user input to request the user device 102 to exit the narrow-band communication mode. In response to the change from the state of the user device 102 or the user input, a request to exit the narrow-band communication mode may be communicated to the base station 104.

For example, if a signal-quality strength of the user device 102 increases above a threshold strength such that the user device 102 is no longer in a low signal-quality state, the user device 102 can communicate, to the base station 104, a request to exit the narrow-band communication mode.

Although techniques using, and apparatuses for implementing, narrow-band communication have been described in language specific to features and/or methods, it is to be understood that the subject of the appended claims is not necessarily limited to the specific features or methods described. Rather, the specific features and methods are disclosed as example ways in which narrow-band communication can be implemented.

What is claimed is:

1. A method performed by a base station of a wireless network, the method comprising:
   receiving, from a user device, during a wide-band communication mode with the user device, and as part of a request from the user device to enter a narrow-band communication mode, an indicator of a low battery charge level of the user device and an indicator of a requested amount of bandwidth;
   determining, based on the indicator of the low battery charge level of the user device and the indicator of the requested amount of bandwidth, a quantity of resource elements of the wireless network to allocate for the narrow-band communication mode with the user device, the resource elements of the wireless network facilitating communication through predetermined amounts of bandwidth and time;
   selecting, from at least one resource block and based on the determined quantity of resource elements of the wireless network, resource elements of the resource block for the narrow-band communication mode with the user device, the selected resource elements of the resource block including one or more, but not all, resource elements of the resource block; and
   communicating, to the user device, an identification of the selected resource elements of the resource block, the identification including respective frequencies and time locations of the selected resource elements of the resource block.

2. The method as recited in claim 1, wherein the indicator of the low battery charge level of the user device and the indicator of the requested amount of bandwidth are is-received via a radio resource control (RRC) communication from the user device.

3. The method as recited in claim 1, wherein the indicator of the low battery charge level of the user device and the indicator of the requested amount of bandwidth are is-received via a medium access control (MAC) layer communication from the user device.

4. The method as recited in claim 1, wherein the identification of the selected resource elements is communicated to the user device as a semi-static communication.

5. The method as recited in claim 4, wherein the semi-static communication comprises a radio resource control (RRC) communication.

6. The method as recited in claim 4, wherein the semi-static communication comprises a medium access control (MAC) layer communication.

7. The method as recited in claim 1, wherein:
   the selected resource elements are selected from the resource block in accordance with a predefined hopping pattern; and
   the identification of the selected resource elements includes a designation of the predefined hopping pattern.

8. The method of claim 1, wherein the wide-band communication mode comprises communicating with the base station via a greater number of resource elements than the resource elements of the resource block.

9. The method of claim 1, wherein the method further comprises:
   receiving, from the user device, an indicator of a high battery charge level of the user device; and
   communicating, to the user device, an identification of second resource elements based on the received indicator of the high battery charge level.

10. The method of claim 9, wherein a quantity of resource elements of the second resource elements comprise more than a quantity of resource elements of the selected resource elements.

11. The method of claim 1, wherein the selecting the resource elements comprises:
   selecting one or more resource elements from a first resource block and one or more resource elements from a second resource block.

12. The method of claim 9, wherein the indicator of the high battery charge level of the user device is received as part of a request to re-enter the wide-band communication mode.

13. The method of claim 10, wherein the quantity of resource elements of the second resource elements corresponds to the wide-band communication mode.

14. A user device comprising:
   a processor; and
   a computer-readable storage medium having stored thereon instructions that, responsive to execution by the processor, cause the processor to perform operations comprising:
      determining a low charge level state of a battery of the user device based on a charge level of the battery of the user device dropping below a threshold level;
      communicating, based on the determination of the low charge level state of the battery of the user device, to a base station of a wireless network, using a wide-band communication mode, and as part of a request to enter a narrow-band communication mode:
         a requested amount of bandwidth; and
         the determined low charge level state of the battery of the user device; and
      receiving, from the base station, an identification of selected resource elements for communication in the narrow-band communication mode, the identification including respective frequencies and time locations of the selected resource elements in a resource block, the selected resource elements including one or more, but not all, resource elements of the resource block.

15. The user device of claim 14, wherein the operations further comprise communicating a determined signal quality of a wireless link between the user device and the base station.

16. The user device of claim 14, wherein the operations further comprise:
   determining a second charge level state of the battery of the user device that is different from the determined low charge level state of the battery of the user device;
   communicating, to the base station, the determined second charge level state of the battery of the user device; and receiving, from the base station an identification of other selected resource elements for communication corresponding to the wide-band communication mode.

17. The user device of claim 16, wherein the second charge level state of the battery of the user device comprises a high charge level state based on the charge level of the battery of the user device rising above the threshold level.

18. The user device of claim 14, wherein:
the operations further comprise receiving a request to enter a power saving mode via a user input; and
the request to enter the narrow-band communication mode is based on the request to enter the power saving mode.

19. The user device of claim 14, wherein the requested amount of bandwidth and the determined low charge level state of the battery of the user device are communicated to the base station over a radio resource control (RRC) communication or a medium access control (MAC) layer communication.

20. The user device of claim 14, wherein the requested amount of bandwidth and the determined low charge level state of the battery of the user device are communicated to the base station over a radio resource control (RRC) communication or a medium access control (MAC) layer communication.

* * * * *

UNITED STATES PATENT AND TRADEMARK OFFICE
CERTIFICATE OF CORRECTION

PATENT NO. : 11,006,413 B2  
APPLICATION NO. : 15/833312  
DATED : May 11, 2021  
INVENTOR(S) : Jibing Wang, Erik Richard Stauffer and Aamir Akram Page 1 of 1

It is certified that error appears in the above-identified patent and that said Letters Patent is hereby corrected as shown below:

In the Claims

Column 15, Lines 46 and 47, after "are" before "via" delete "is-received" insert --received--
Column 15, Lines 56 and 57, after "are" before "via" delete "is-received" insert --received--

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*